(12) United States Patent
Udin

(10) Patent No.: US 7,462,321 B2
(45) Date of Patent: Dec. 9, 2008

(54) PROCESS FOR THERMORMING A THREE-DIMENSIONALLY CURVED PANEL

(75) Inventor: Alexandre Udin, St Lunaire (FR)

(73) Assignee: Sail Innovation, Rennes (FR)

( * ) Notice: Subject to any disclaimer, the term of this patent is extended or adjusted under 35 U.S.C. 154(b) by 498 days.

(21) Appl. No.: 10/495,167

(22) PCT Filed: Sep. 18, 2002

(86) PCT No.: PCT/FR02/03194

§ 371 (c)(1),
(2), (4) Date: Nov. 16, 2004

(87) PCT Pub. No.: WO03/024688

PCT Pub. Date: Mar. 27, 2003

(65) Prior Publication Data

US 2005/0064148 A1  Mar. 24, 2005

(30) Foreign Application Priority Data

Sep. 18, 2001  (FR) .................................. 01 12056

(51) Int. Cl.
*B29C 51/10* (2006.01)
*B29C 51/14* (2006.01)
*B29C 51/18* (2006.01)

(52) U.S. Cl. .................. 264/553; 264/554; 264/322; 264/316; 425/388; 425/403

(58) Field of Classification Search .................. None
See application file for complete search history.

(56) References Cited

U.S. PATENT DOCUMENTS

| | | | |
|---|---|---|---|
| 2,410,888 A * | 11/1946 | Lucy ........................... | 264/219 |
| 3,004,295 A | 10/1961 | Bottoms et al. | |
| 4,274,858 A * | 6/1981 | Claassen et al. ................ | 65/273 |
| 4,349,375 A * | 9/1982 | Kellar et al. ................... | 65/219 |
| 4,430,110 A * | 2/1984 | Frank et al. ................... | 65/104 |
| 4,695,032 A * | 9/1987 | Desport ....................... | 249/112 |
| 4,723,766 A | 2/1988 | Beeding | |
| 4,731,144 A | 3/1988 | Kommineni et al. | |
| 5,151,277 A | 9/1992 | Bernardon et al. | |
| 5,470,590 A | 11/1995 | Brienza et al. | |
| 5,846,464 A * | 12/1998 | Hoffman ...................... | 264/219 |
| 6,106,649 A * | 8/2000 | Slyne .......................... | 156/179 |
| 6,112,689 A * | 9/2000 | Baudet ................... | 114/102.33 |

FOREIGN PATENT DOCUMENTS

| | | |
|---|---|---|
| EP | 0 056 657 | 7/1982 |
| FR | 2 548 577 | 1/1985 |
| FR | 2 607 099 | 5/1988 |
| FR | 2 813 677 | 3/2002 |

(Continued)

*Primary Examiner*—Edmund H. Lee
(74) *Attorney, Agent, or Firm*—Young & Thompson

(57) ABSTRACT

A device for making panels with three-dimensional curvature from a sheet material, includes a forming impression (5) defined by a membrane (6) including an elastically stretchable skin (11), preferably in combination with a skeleton formed by a grid pattern of flexurally elastic battens (10) which are mobile in longitudinal translation relative to the skin, and a set of elements for selectively deforming the impression acting on the battens (10) of the membrane to impart thereto an adaptable three-dimensional curvature. The invention is particularly useful for making sails.

15 Claims, 8 Drawing Sheets

FOREIGN PATENT DOCUMENTS

| | | |
|---|---|---|
| GB | 1 425 312 | 2/1976 |
| GB | 2 268 699 | 1/1994 |
| WO | WO 87/07233 | 12/1987 |
| WO | WO 00/20312 | 4/2000 |
| WO | WO 01/76863 | 10/2001 |
| WO | WO 01/98141 | 12/2001 |
| WO | WO 02/055380 | 7/2002 |

* cited by examiner

FIG_1
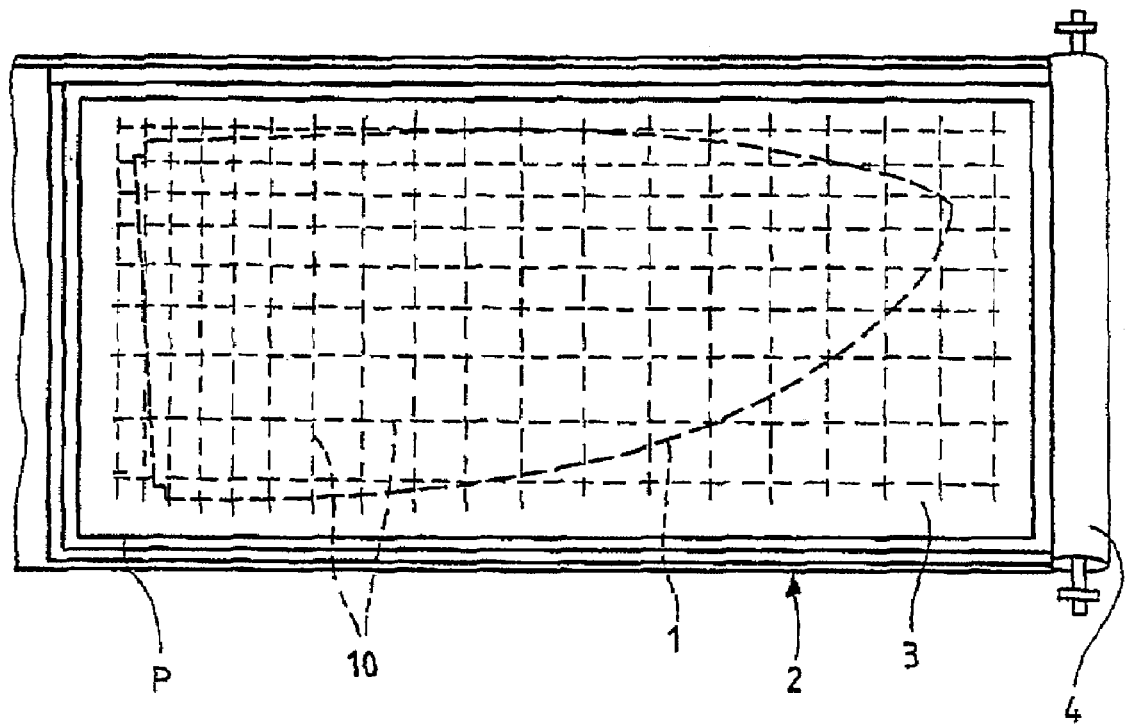

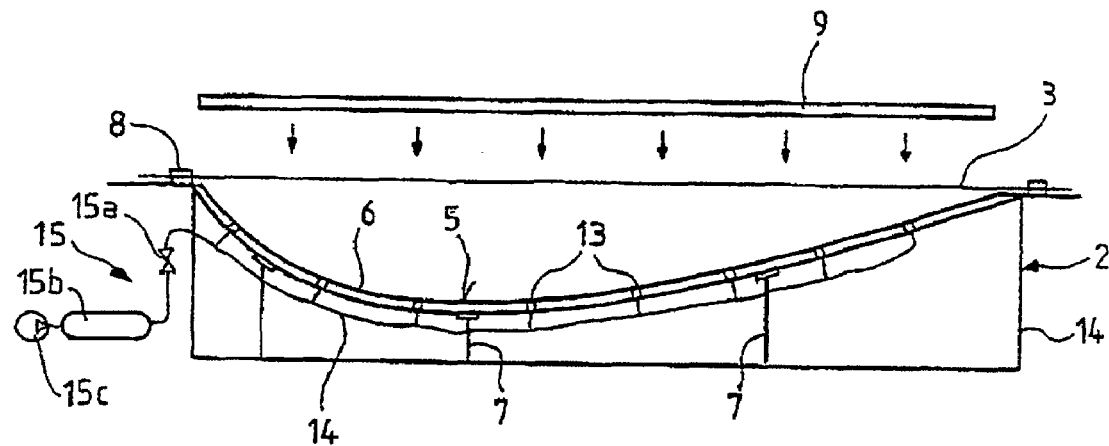
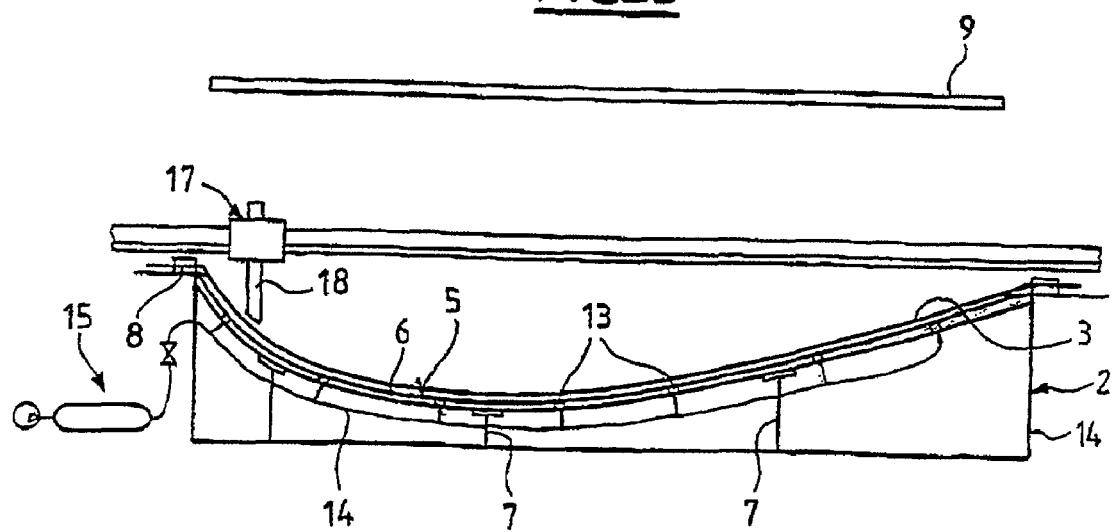

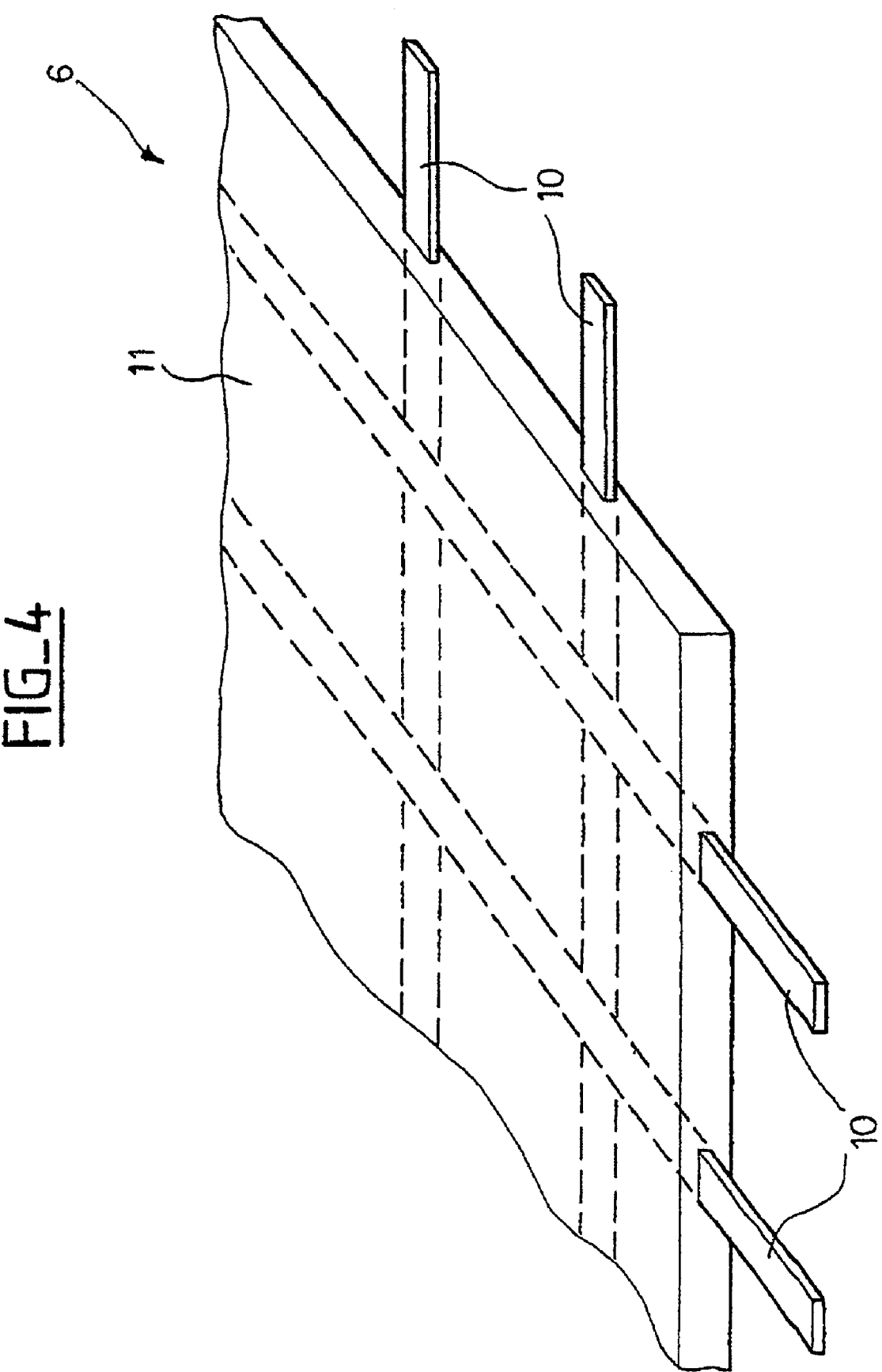

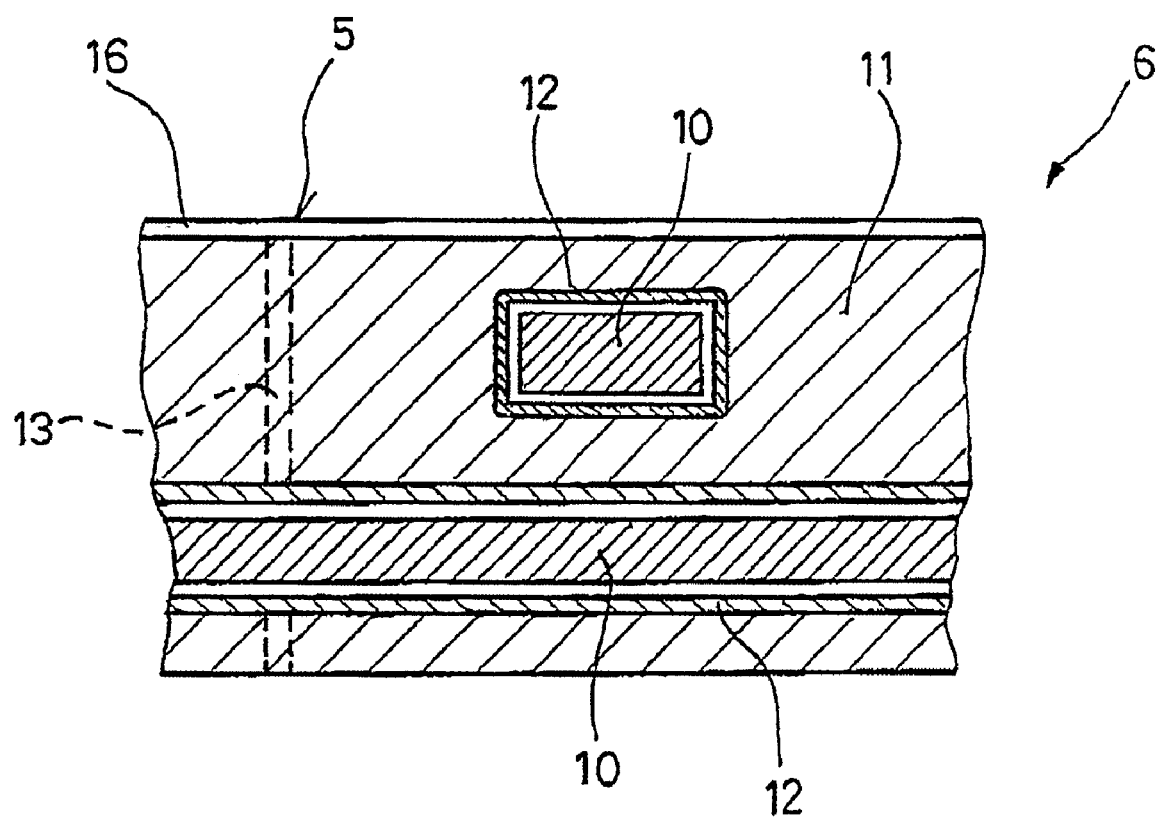
FIG_5

FIG_6
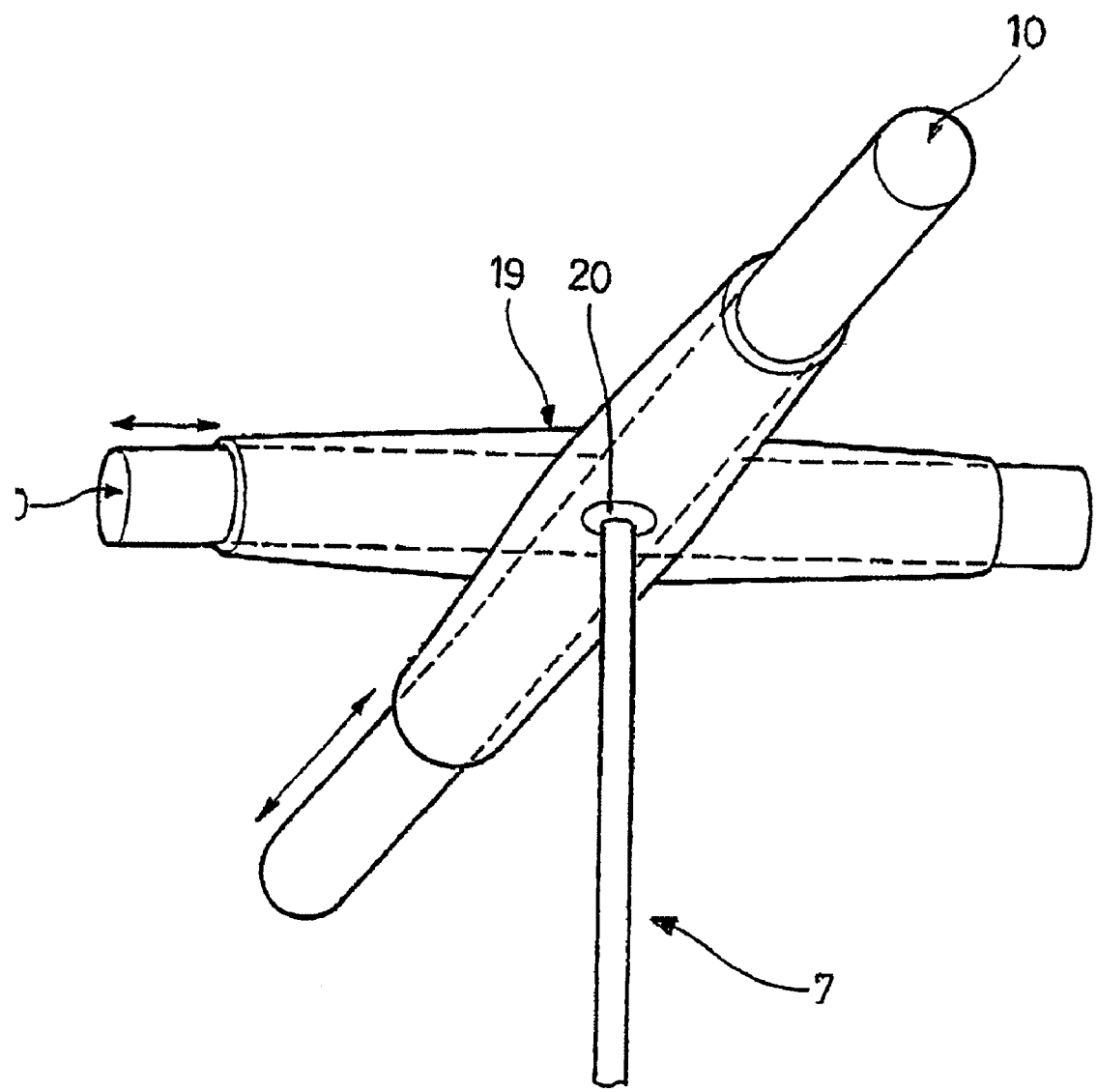

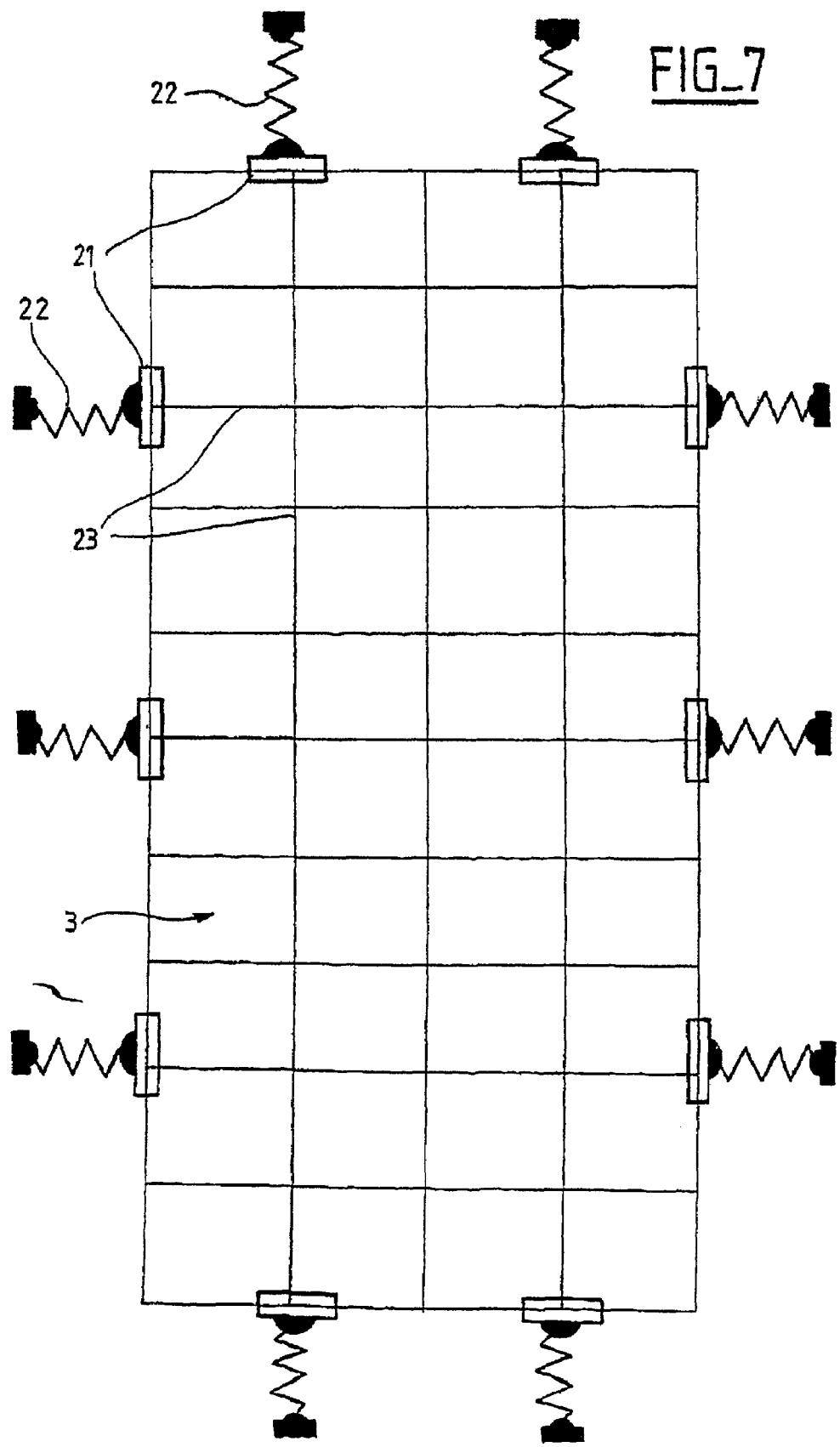
FIG_7

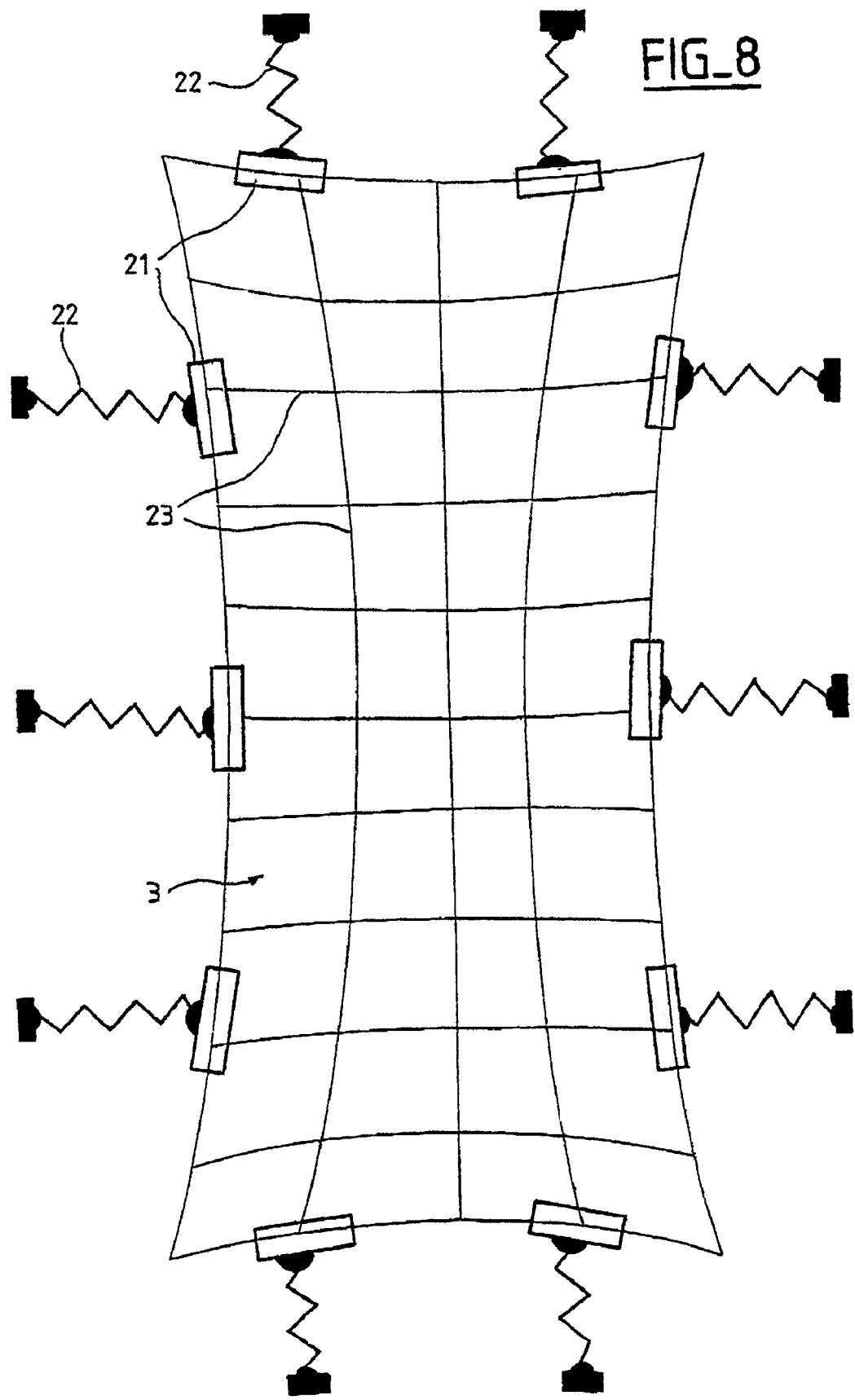

FIG_9
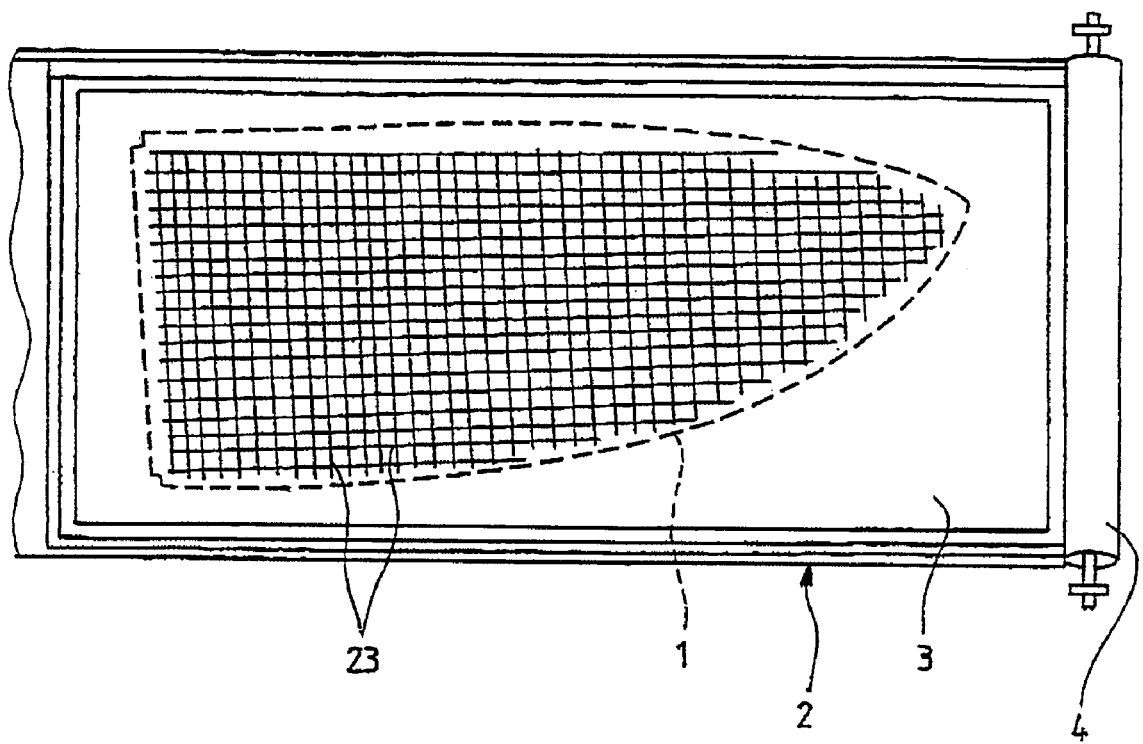

PROCESS FOR THERMORMING A THREE-DIMENSIONALLY CURVED PANEL

The present invention relates to the fabrication of panels with three-dimensional curvature made from material in sheet form. This may, for example, although not exclusively, be the fabrication by thermoforming of sails with three-dimensional curvature from a thermoplastic material in sheet form. The invention also relates to a single-piece sail thus fabricated.

BACKGROUND OF THE INVENTION

Sails for sailcraft, which must have a three-dimensional curvature to be efficient (to "catch the wind"), are traditionally fabricated by sewing together a plurality of fabric panels cut out so that assembling them produces a three-dimensionally curved sail. Considerable work is required to compute the shape of the panels, mark them out, cut them out, apply glue and assemble the panels by sewing them together. Because this is labor intensive, the result is uncertain and often subject to errors. Also, the quality of sails made in this way leaves something to be desired, the seams creating points of weakness from which tears can start because of the holes made by the needle of the sewing machine.

The document EP-056 657-A discloses a three-dimensionally curved single-piece sail consisting of a single piece of flexible thermoplastics material sheet, possibly reinforced with thermoplastics polymer fibers. It describes a method of fabricating a sail by holding a continuous sheet of thermoplastics material, possibly reinforced with thermoplastics polymer fibers, by its edges, heating the sheet, applying pressure to the heated sheet to shape it by stretching it selectively, and cooling it. It states, without giving further details, that the sheet material is stretched by application of pressure over a mold or a curved shape, i.e. a convex molding surface.

Finally, the documents EP-475 083-A and WO-01/00487-A disclose laminated material sails made on a convex mold surface, either by successively depositing a flexible first sheet, continuous filaments, and a flexible second sheet, and laminating the combination on the mold surface, or by successively depositing two layers each formed of a plurality of sheets reinforced with filaments, with the edges of the panels of the two layers offset, and laminating the combination on the mold surface. According to the document EP-475 083-A, the mold surface whose shape corresponds to the shape of the sail to be fabricated is defined by rows of members with an appropriate profile mounted on parallel flexible battens, each of which is supported along its length by adjustable height columns supported by crossmembers of a supporting framework. These fabrication techniques entail time-consuming and sophisticated manual handling of costly fibers and make use of devices lacking in flexibility, and for this reason sails made in this way are restricted to top of the range racing craft.

SUMMARY OF THE INVENTION

The present invention in general provides a device for the fabrication of panels with three-dimensional curvature from thermoplastic material in sheet form and more particularly although not exclusively, a device for the fabrication of three-dimensionally curved sails, for example single-piece sails intended for small craft and in particular for the mass market, this device allowing three-dimensionally curved panels and more particularly sails to be fabricated at reduced cost, without high labor costs.

The invention also provides a device for the fabrication of three-dimensionally curved panels which is of a simple structure and flexible in use and makes it possible quickly and without complicated and lengthy conversion work to switch over to the fabrication of panels of different shapes and sizes made of thermoplastic material in sheet form.

The invention also provides a single-piece sail thus fabricated.

The device that is the subject of the present invention, intended for the fabrication of panels with three-dimensional curvature from thermoplastic material in sheet form comprises a mold surface defined by a membrane comprising an elastically stretchable skin and a network of means for selectively deforming the imprint acting on said membrane to impart an alterable three-dimensional curvature to the mold surface.

As a preference, the membrane may additionally comprise a skeleton associated with the skin, formed by a network of battens which can bend elastically and are mobile in longitudinal translation with respect to one another and with respect to the skin associated with this skeleton without affecting the surface of the skin defining the mold surface.

This makes it possible to reduce the number of means for deforming the mold surface without having, for all that, angles of discontinuities of curvature on the mold surface. What actually happens is that the battens allow the skin to enjoy their flexural elasticity, thus giving the mold surface a uniform curvature.

According to one advantageous embodiment, the battens are slideably mounted in flexible sheaths preferably elastically stretchable, attached to the skin of the membrane, preferably embedded in the skin by overmolding. These sheaths thus contribute to deforming the skin without interfering with it.

In the context of the present invention, the means for deforming the membrane may be designed in such a way that the curvature imparted to this membrane is convex and/or concave and therefore raised and/or hollowed with respect to the sheet-form material placed above the membrane. However, according to a preferred embodiment, the curvature imparted to the membrane by the deforming means is a concave curvature and the sheet-form thermoplastic material placed on the concave side of the membrane, when heated, deforms in stretching to espouse the concave shape of the membrane, under the effect of a reduction in pressure created between the membrane and the thermoplastic material.

As a preference, the membrane has, passing through it, a network of suction openings connected underneath the membrane to pressure reducing means so that the reduced pressure thus produced between the membrane and the material in sheet form allows this material to press firmly against the membrane and faithfully adopt the curvature thereof.

These suction openings in the membrane are preferably lined with non-deformable sleeves constituting suction nozzles. These non-deformable sleeves advantageously allow the suction openings to be given a very small cross section which is not in any way affected by the deformation that the membrane undergoes under the effect of the mold surface deformation means.

The membrane may advantageously, on its face constituting the mold surface, either have a rough surface finish, for example a granular finish, or be covered with a layer of gas-permeable material, for example a porous material, that improves the circulation of air between the suction openings so as to avoid any air becoming trapped between the membrane and the sheet.

The suction openings passing through the membrane may open underneath the membrane, for example into a network of flexible pipes resistant to crushing and connected to pressure reducing means, or into a flexible pocket connected to these pressure reducing means. In both instances, the reduced pressure acts only on the top side of the membrane to press the sheet form material firmly against the mold surface and does not alter the shape imparted to the imprint by the mere action of the selective deformation means.

In a preferred case, the membrane deformation means are designed to give the membrane a concave curvature. In this case, the provision of the suction openings passing through the membrane, by virtue of which openings all the parts of the sheet-formed thermoplastic material are pressed firmly against the mold surface as they gradually come into contact with the latter, according to the variable depth of the imprint, allows the material to be deformed while at the same time causing it to undergo variable stretching dependent on the depth of the imprint. In this instance, the degree of stretching of the sheet increases from the edges toward the center, and the panel cut from the material in sheet form thus formed has a thickness that varies according to the load areas, namely a thickness and therefore a strength which is greater at the edges and at the corners than in the central part. This is particularly advantageous in the case of a single-piece sail.

The network of battens associated with the skin of the membrane to make the deformation of the mold surface more uniform, and likewise the network of imprint deformation means, may be uniform networks or, as a preference, for example when forming sails, non-uniform networks in that the battens and the imprint deformation means may be more concentrated in certain areas, namely in the regions where the curvatures to be imparted to the sheet-form material are more pronounced. Such is the case of the leading edge and the base areas of sails.

Another possibility is to provide, between thicker battens that are subjected directly to the action of the deforming means (jacks), more slender and therefore more flexible intermediate battens which are not subjected directly to the action of the deforming means.

BRIEF DESCRIPTION OF THE DRAWINGS

Other features and applications of the invention will become apparent on reading the following description of one nonlimiting embodiment illustrated by the accompanying drawings, in which:

FIG. 1 is a diagrammatic plan view of one embodiment of a device according to the invention in its application to the fabrication of a sail formed by thermoforming;

FIG. 2 is a diagrammatic sectional view of the device of FIG. 1 during the thermoforming phase;

FIG. 3 is a corresponding diagrammatic sectional view of the device during the cutting out phase;

FIG. 4 is a partial view of the membrane of the device of FIGS. 1 to 3;

FIG. 5 is a partial sectional view of the membrane showing the sheathed battens embedded in the skin of the membrane;

FIG. 6 is a simplified diagrammatic view showing one mode of operation of the jacks that deform the membrane;

FIGS. 7 and 8 diagrammatically show a device intended for the thermoforming of a material in sheet form comprising non-thermoplastic fibers, and FIG. 9 illustrates another possible implementation of the invention.

DETAILED DESCRIPTION OF THE INVENTION

In FIGS. 1 to 3, a three-dimensionally curved single-piece sail 1, as shown in dashed outline in FIG. 1, is fabricated by vacuum thermoforming and cutting out on a variable geometry mold 2 a thermoplastics material sheet 3 paid out from a spool 4 disposed at one end of the mold 2.

The mold 2 has a concave mold surface 5 defined by a membrane 6 made from an elastically stretchable and heat resistant material placed on the mold 2, means 7 for selectively deforming the imprint 5, and a frame 8 for securing the sheet material 3 at its periphery, the sheet being held taut using the frame 8 some distance above the membrane 6. Some distance above the mold 2 and above the sheet material 3 are arranged heating means 9 for heating the sheet material 3.

In FIGS. 4 and 5, the membrane 6 includes a skeleton formed by a rectangular grid of battens 10, made from carbon fibers impregnated with resin such as an epoxy resin, for example, which can bend elastically, and a skin 11 made from an elastically stretchable material, for example a silicone-based elastomer. The battens 10 are surrounded by flexible sheaths 12 (FIG. 5) in which they can slide longitudinally and which are molded into the skin 11.

The skin 11 has, passing right through it, a network of suction openings 13, preferably consisting of nozzles of a clearly defined cross section in the form of non-deformable sleeves embedded in the skin. These openings being connected in this example underneath the membrane 6 by flexible pipes 14 which are, however, able to withstand the crushing that they experience under the effect of a reduced internal pressure, to pressure reducing means 15 comprising, in the example illustrated in FIGS. 2 and 3, a valve 15a, an accumulator-reservoir 15b and a vacuum pump 15c.

The upper face of the skin 11 of the membrane 6 facing the mold surface 5 is covered, according to FIG. 5, with a thin layer 16 of a gas-permeable material, for example a porous material such as a foam.

The means 7 for selectively deforming the membrane 6 can be screw jacks or hydraulic jacks, for example, which can be advantageously controlled remotely, preferably by computer, which enables the shape of the imprint 5 to be selectively varied quickly and precisely.

The heating means 9 can include a heating panel, for example an infrared radiation heating panel, in this case covering the whole of the surface of the mold surface 5, or any other suitable device.

The heating means 9 are mobile horizontally so that they can be retracted after thermoforming the sheet material 3 over the mold surface 5, to allow the installation of a device 17 for cutting the contour of the sail 1 out from the thermoformed and cooled sheet material 3. The cutting device 17 can include a cutting head 18 with a cutting blade, a heating blade, a cutting water jet or preferably a cutting laser, for example, movable selectively over the whole of the surface of the mold 2, and possibly in the heightwise direction so as to remain at a constant height above the mold surface 5, by a control system that can be connected to the control system for the jacks 7 in order to avoid damaging the membrane 6.

Instead of cutting out the thermoformed material in sheet form 3 directly from the mold surface 5, it is also possible to carry out tracing of the thermoformed material in sheet form 3 on the mold surface 5 and to perform the cutting out at another position by optical marking of the tracing line.

In FIG. 6, the jacks 7 for selectively deforming the membrane can preferably act on the battens 10, which here have a circular section rather than a rectangular section as in FIGS. 4 and 5. To be more precise, each jack 7 acts on a rigid guide 19 through which at least one batten passes, this guide having, in the example illustrated, the shape of a cross through which two battens 10 pass at the point where these battens cross. The sheaths, not depicted here, of the battens 10 may either pass through the guides 19 with the battens or be interrupted at the location of the guides 19. The guides 19 are advantageously embedded in the skin, not depicted here, of the membrane, just like the remaining part of the skeleton formed by the grid structure of battens 10 or, more precisely, the sheets 12 surrounding the battens 10.

The guides 19 allow the battens 10 to accompany the vertical movements of the jacks 7, as the latter shorten and lengthen, while at the same time leaving them the possibility of sliding freely in their lengthwise direction with respect to the skin.

To prevent the jacks 7 from impeding the deformation of the mold surface, the jacks may advantageously be connected in an articulated fashion, for example by a connection 20 of the ball joint or flexible type, to the guides 19 and possibly also to their anchoring support.

It should be noted that sail reinforcements (corner reinforcements, batten gussets, reef reinforcements, etc.) can have glue applied to them and be placed in the mold so that they are glued to the sail when it is thermoformed, which exploits the pressure drop and the heat of the thermoforming phase to apply pressure to these parts and to facilitate polymerization of the glue, whilst reducing labor costs.

Although the embodiment shown and described relates to thermoforming a single-piece sail on a concave or negative (hollow) mold mold surface, the invention is not limited to this embodiment and, on the contrary, encompasses not only thermoforming on a convex or positive (raised) mold mold surface, but also all combinations of the two embodiments (sails with a reversal of curvature). It should be pointed out that in the case of a convex mold, it is necessary to provide means for producing vertical movement between the material that is to be thermoformed, held in the frame, and the mold, because the sheet-form material must not be in contact with the mold during heating. Such means are not needed when thermoforming on a concave mold. This is because in this case, the material held in the frame, as it is heated, deforms downward under the effect of the reduced pressure to adopt the shape of the mold surface.

Furthermore, the thermoforming of the sheet-form material may be done not only by reduced pressure, as in the example illustrated, but also using pressure or a combination of both.

In addition, the material in sheet form 3, instead of being in one piece, could equally comprise several panels assembled either in advance or at the time of forming.

The sheet thermoplastics material can also consist, for example, of a film or a composite or laminate of several films, for example of PET, preferably biaxially oriented ("MYLAR"), PVC, polycarbonate, which can be reinforced with fibers. These can in particular be high-strength continuous fibers (filaments) that are not thermoplastics fibers, for example carbon or aramid fibers. To enable thermoforming by stretching the thermoplastics sheet or composite despite the presence of the fibers, use may for example in this case be made of a material in sheet form which has no fiber in the area of its periphery, and therefore at the clamping frame 8. This prevents the fibers from being immobilized by the frame 8 and allows the fibers to slide with respect to the sheet material during thermoforming.

Particularly in the case of two sheets sandwiching such fibers between them, it is then the sheets that immobilize the fibers (the fiber meshes) when the material is in the deformed position. As the fibers are somewhat retightened by the thermoforming of the material, this balances out the tensions.

Depending on the situation it is possible either to cut out the sail after thermoforming or, in order to avoid the loss of sail material that that could entail, to cut out the sail before it is formed and to thermoform it after having bonded it onto an inexpensive stretchable transfer material exhibiting thermoplasticity characteristics comparable with those of the sail material.

Furthermore, the invention also relates to the forming of sheet materials which are not in themselves impermeable, for example weaves or knits, in which case, in order to press such material firmly against the mold surface, they are combined with at least one impermeable film which then allows this firm pressing through reduction in pressure.

According to one alternative it is also possible to enclose such materials in an impermeable envelope into which a vacuum is pulled.

It should be pointed out that the present invention also relates to a single-piece sail formed of a thermoplastic material in the form of at least one continuous sheet reinforced with continuous sheet reinforced with continuous fibers (filaments) of non-thermoplastic material such as carbon or aramid fibers, this sheet having a permanent three-dimensional curvature obtained by thermoforming.

However, although the above description relates to an example relating to the manufacture of sails for sailcraft, the invention in general applies to the fabrication of three-dimensionally curved panels with low development of shape (reduced depth) from sheet materials that may or may not be thermoplastic. These may in this instance amongst other things be bodywork panels, for example made of thermosetting materials.

In addition, while in the example depicted and described, the battens constituting the skeleton of the membrane are in the form of a rectangular grid structure, therefore a two-directional network, these battens, in the context of the present invention, may be in the form of different networks, for example a one-directional network or also in the form of any other multi-directional network.

Furthermore, the rectangular grid pattern of the battens 10 of the skeleton of the membrane (and the network of jacks 7 for the selective deformation of the membrane) may be uniform or non-uniform. In particular, in the case of sails, it may be advantageous for the battens (and the jacks) to be closer together in the regions of the leading edge and the base of the sail, where the curvatures are more pronounced, as can be seen in FIG. 1 where the battens 10 are depicted symbolically in dotted line.

FIG. 1 also shows that the battens 10 do not extend as far as the ends of the mold, the membrane 6 at this point being thinner and therefore more flexible so as to give the mold a twisted shape while at the same time maintaining the sealing between the mold and the support frame.

When the thermoplastic material in sheet form contains non thermoplastic fibers extending as far as the edges, it may be advantageous to hold the sheet material on the mold not using a frame such as the frame 8 according to FIG. 1. This is because such a frame would in this case exert a reduced amount of clamping well defined to allow the fibers to slide while at the same time preventing pleats from forming in the sheet. This is why it may then be preferable to use, in order to hold the sheet at its edges, an arrangement such as that illustrated in FIGS. 7 and 8, comprising several attachment points 21 defined, for example, by jaws distributed around the edges and mounted for example using springs 22 or jacks articulated to the mold allowing defined tension to be exerted on the sheet and accompanying the sheet in its inwards movement as it is shaped on the mold surface as a result of the presence of the fibers 23 which cannot stretch. FIG. 8 clearly shows the differential deformation that the cells or meshes of the fibers of the sheet 3 experience as the sheet is being formed on the mold surface from the flat initial state according to FIG. 7 (the meshes of fibers are depicted only very symbolically).

Of course, in this case it is necessary, because of the absence of the holding frame 8 which also provides sealing, to provide a sealing system independent of the sheet-holding system.

Another possibility of implementation of the invention, illustrated very schematically in FIG. 9, consists in thermoforming the sail 1 in a sheet material 3 reinforced with fibers 23 only within the periphery of the sail 1; in other words, the fibers 23 reinforcing the sail 1 extend into the sheet material 3 without going as far as the edges of the sail 1.

In order to reduce the number of jacks, it is also possible to use the membrane containing, on the one hand, a fairly sparse network of battens 10 directly subjected to the action of the jacks (for example according to FIG. 6) and, on the other hand, thinner more flexible battens which are arranged between the battens 10 and are not directly subjected to the action of the jacks.

Furthermore, depending on the nature of the three-dimensionally curved panels that are to be fabricated, it may prove sufficient to have the jacks or other means of deforming the mold surface act directly on the skin rather than on the battens or the crosses or other rigid guides through which the battens pass and which are embedded in the skin of the membrane provided with a skeleton. In all cases, it is advantageous to connect the jacks to the membrane via a flexible or articulated link, for example of the ball joint type.

Depending on the panels that are to be produced, the frame 8 which serves to hold the sheet-form material during thermoforming may be replaced by smaller sized frames, not depicted, tailored to the size and shape of the panels.

As far as the shape of the mold is concerned, it is possible to use shapes other than the rectangular shape depicted, for example a trapezoidal, triangular or some other shape.

Finally, although this has not been illustrated in the drawings, the mold 2 may advantageously be fitted with means for cooling the sheet-form material 3 after thermoforming, such as blowers or other means known per se, for example a network for circulating water through the mold (through the membrane).

The invention claimed is:

1. A process for thermoforming a three-dimensionally curved panel starting from a laminated sheet material including reinforcement fibers therein, said process comprising the steps of:
   providing a mold having a peripheral frame and a mold surface defined by a membrane including an elastically stretchable skin and a skeleton associated with said skin, the skeleton being formed by a grid of elastically bendable battens;
   selectively deforming said membrane defining said mold surface so as to impart to said mold surface a selectively deformed mold surface of a three dimensional curvature;
   during the step of selectively deforming said membrane, causing the battens to move in translation in a direction of the batton's length with respect to one another and with respect to said skin;
   securing said laminated sheet material including reinforcement fibers therein so that said sheet material is held by said frame of said mold; and
   heating said sheet material so that said sheet material becomes thermoformed on said selectively deformed mold surface.

2. The process as claimed in claim 1, wherein the battens (10) are slideably mounted in flexible stretchable sheaths (12) attached to the skin (11).

3. The process as claimed in claim 2, wherein the sheaths (12) are placed embedded in the skin (11) by overmolding.

4. The process as claimed in claim 1, wherein said deforming step includes acting upon the membrane by using jacks (7) connected to the membrane (6) in an articulated fashion.

5. The process as claimed in claim 4, wherein the battens (10) are acted upon using the jacks (7).

6. The process as claimed in claim 5, wherein each jack (7) acts on a rigid guide (19) through which at least one batten (10) passes and which is embedded in the skin (11) of the membrane (6).

7. The process as claimed in claim 6, wherein the skeleton is formed of a multidirectional network of battens (10) and in that each jack (7) acts on a cross-shaped guide (20) through which at least two battens (10) pass at the point where they cross.

8. The process as claimed in claim 1, wherein a vacuum is created using a network of suction openings (13) that pass through the membrane (6) and are connected underneath the membrane to underpressure means (14, 15).

9. The process as claimed in claim 8, in which, for the thermoforming of the thermoplastic material in sheet form (3), the latter is held around its periphery, said material being placed on top of the membrane (6), and the sheet material is heated to allow it to deform by stretching in order to adopt the shape of the impression.

10. The process as claimed in claim 8, wherein a nonimpermeable sheet material is formed by combining it with a non-impermeable film in order to allow vacuum pressing.

11. The process as claimed in claim 10, in which the non-impermeable sheet material is enclosed in an impermeable envelope in which the vacuum is created.

12. The process as claimed in claim 1, wherein the sheet material is cut out or traced on the forming impression (5) after it has been formed on the impression.

13. The process as claimed in claim 1, wherein said deforming step includes acting upon the membrane by using jacks (7) connected to the membrane (6) in an articulated fashion via a ball joint connection (20).

14. A process for thermoforming a three-dimensionally curved panel, comprising the steps of:
   with a mold having i) a peripheral frame, ii) a mold surface defined by a membrane including an elastically stretchable skin, and iii) a skeleton associated with the skin with the skeleton being formed by a grid of elastically bendable battens, selectively deforming the membrane to impart to the mold surface a three dimensional curvature, including moving the battens in longitudinal translation with respect to one another and with respect to the skin so that the longitudinal translation of the battens forms the grid obtains a selectively deformed mold surface with the three-dimensional curvature;
   securing a laminated sheet material having reinforcement fibers included therein so that the sheet material is held by the frame of the mold; and
   heating the secured sheet material so that the sheet material becomes thermoformed on the selectively deformed mold surface.

15. The process as claimed in claim 14, wherein in said deforming step, said moving of the battens in longitudinal translation with respect to one another and with respect to the skin, is by control of deformation jacks (7) connected to the membrane (6) in an articulated fashion.

* * * * *